United States Patent
Szczerba et al.

(10) Patent No.: US 8,988,399 B2
(45) Date of Patent: Mar. 24, 2015

(54) VEHICULAR INTERFACE INCLUDING STEERING WHEEL CONTROL ASSEMBLY

(75) Inventors: Joseph F. Szczerba, Grand Blanc, MI (US); John K. Lenneman, Okemos, MI (US); Scott P. Geisler, Clarkston, MI (US); Branden G. Neish, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1766 days.

(21) Appl. No.: 11/426,979

(22) Filed: Jun. 28, 2006

(65) Prior Publication Data

US 2008/0001931 A1 Jan. 3, 2008

(51) Int. Cl.
| G06F 3/033 | (2013.01) |
| G06F 3/0484 | (2013.01) |
| B60K 37/06 | (2006.01) |
| G06F 3/0362 | (2013.01) |

(52) U.S. Cl.
CPC ............ *G06F 3/04847* (2013.01); *B60K 37/06* (2013.01); *G06F 3/0362* (2013.01); *B60K 2350/928* (2013.01)
USPC .......................................... 345/184; 345/156

(58) Field of Classification Search
CPC .. G06F 3/0354; G06F 3/03541; G06F 3/0362
USPC ........................... 345/184, 76–104, 156–167; 200/61.54–61.57
See application file for complete search history.

(56) References Cited

U.S. PATENT DOCUMENTS

| 5,916,288 | A | * | 6/1999 | Hartman ......................... 701/36 |
| 5,949,149 | A | * | 9/1999 | Shitanaka et al. ............ 307/10.1 |
| 6,005,488 | A | * | 12/1999 | Symanow et al. ........ 340/825.56 |
| 6,418,362 | B1 | * | 7/2002 | St. Pierre et al. ............... 701/36 |
| 6,567,676 | B1 | * | 5/2003 | Tsai ............................ 455/569.2 |
| 6,768,067 | B2 | * | 7/2004 | Adachi et al. .............. 200/61.54 |
| 6,961,644 | B2 | * | 11/2005 | Mercier et al. .................. 701/36 |
| 7,026,561 | B2 | * | 4/2006 | Min .......................... 200/61.54 |
| 7,129,431 | B2 | * | 10/2006 | Ichimura et al. ........... 200/61.54 |
| 7,148,437 | B2 | * | 12/2006 | Wahl et al. ................. 200/61.54 |
| 7,217,894 | B2 | * | 5/2007 | Miyako et al. ............. 200/61.54 |
| 2002/0085043 | A1 | * | 7/2002 | Ribak ............................ 345/810 |
| 2002/0171627 | A1 | * | 11/2002 | Noguchi et al. .............. 345/156 |
| 2003/0023353 | A1 | * | 1/2003 | Badarneh .......................... 701/1 |
| 2004/0046751 | A1 | * | 3/2004 | Heimermann et al. ........ 345/184 |
| 2004/0050673 | A1 | * | 3/2004 | Takahashi et al. .......... 200/61.54 |
| 2005/0012599 | A1 | * | 1/2005 | DeMatteo .................. 340/425.5 |
| 2005/0021190 | A1 | * | 1/2005 | Worrell et al. ..................... 701/1 |
| 2005/0073195 | A1 | * | 4/2005 | Popilek ........................ 307/10.1 |
| 2005/0167252 | A1 | * | 8/2005 | Inoue et al. ................ 200/61.54 |
| 2005/0247549 | A1 | * | 11/2005 | Wahl et al. ................. 200/61.54 |
| 2006/0086022 | A1 | * | 4/2006 | Would et al. .................... 40/584 |
| 2007/0006083 | A1 | * | 1/2007 | Daniels et al. ................ 715/742 |

(Continued)

*Primary Examiner* — Alexander Eisen
*Assistant Examiner* — Nelson Lam
(74) *Attorney, Agent, or Firm* — Ingrassia Fisher & Lorenz, P.C.

(57) ABSTRACT

A user control assembly is provided for use on a vehicle having a processor, a steering wheel, and a plurality of vehicular systems controllable by the processor each having first and second adjustable features. The user control comprises a first button mounted on the steering wheel and coupled to the processor for selecting one of the plurality of vehicular systems, and first and second rotary dials mounted on the steering wheel and coupled to the processor for adjusting the first and second adjustable features associated with the selected system.

7 Claims, 5 Drawing Sheets

(56) References Cited

U.S. PATENT DOCUMENTS

| | | | |
|---|---|---|---|
| 2007/0194902 A1* | 8/2007 | Blanco et al. | 340/461 |
| 2009/0140994 A1* | 6/2009 | Tanaka et al. | 345/173 |
| 2012/0120345 A1* | 5/2012 | Takato | 349/62 |
| 2013/0050114 A1* | 2/2013 | Backman | 345/173 |
| 2013/0106693 A1* | 5/2013 | Okuyama et al. | 345/157 |

* cited by examiner

VEHICULAR INTERFACE INCLUDING STEERING WHEEL CONTROL ASSEMBLY

TECHNICAL FIELD

The present invention generally relates to a steering wheel control assembly and, more particularly, to a vehicular interface utilizing a control assembly deployed on the steering wheel of a vehicle.

BACKGROUND OF THE INVENTION

Vehicles are becoming increasingly equipped with a wide range of systems including features that may be adjusted by a user of the vehicle. Consider, for example, a vehicular audio system wherein a user (i.e., a driver or passenger) may be required to choose from multiple audio sources (e.g., CD, XM radio, FM radio, AM radio, onboard hard drive, an auxiliary source, etc.), and then from a plurality of features associated with the selected audio source (e.g., tracks for a particular CD, stations for FM radio, audio files for the onboard hard drive, etc.). At the same time, the user may be permitted to fine tune the audio system's tone balance (e.g., adjust the relative levels of bass, treble, mid-range tones, etc.), adjust the system's volume, and/or manipulate the appearance of the a display (e.g., time display for CD tracks, broadcast text display for radio, graphic equalizer display, backlight color, etc.).

To help manage the ever-growing number of vehicular systems and system features, interfaces have been developed that allow users to control multiple vehicular systems. One known user interface, referred to as a Driver Information Center (DIC), includes a plurality of buttons and a display (e.g., a liquid crystal display) capable of displaying several lines of characters. The DIC is typically disposed on the vehicle's center stack located between the driver seat and the front passenger seat so that the controls may be accessed by either the driver or a front passenger of the vehicle. To utilize such an interface, a user navigates through a tiered hierarchy of menus to view and select amongst various vehicular systems and system features. Tiered menu structures of this type can become relatively complex and often require that a user advance through several different levels of menus to locate a desired feature. Additionally, such menu structures may not permit the simultaneous display of multiple groups of system features.

It should thus be appreciated that it would be desirable to provide a user interface employing a relatively intuitive and shallow menu structure (i.e., comprising no or few tiers). It should also be appreciated that it would be desirable to provide a means for utilizing such a user interface, such as a user control assembly mounted on the steering wheel and thus readily accessible to the driver of a vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A user control assembly is provided for use on a vehicle having a processor, a steering wheel, and a plurality of vehicular systems controllable by the processor each having first and second adjustable features. The user control comprises a first button mounted on the steering wheel and coupled to the processor for selecting one of the plurality of vehicular systems, and first and second rotary dials mounted on the steering wheel and coupled to the processor for adjusting the first and second adjustable features associated with the selected system.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the system and uses of the invention. Furthermore, there is no intention to be bound by any expressed or implied theory presented in the preceding technical field, background, brief summary or the following detailed description.

Figure 1:
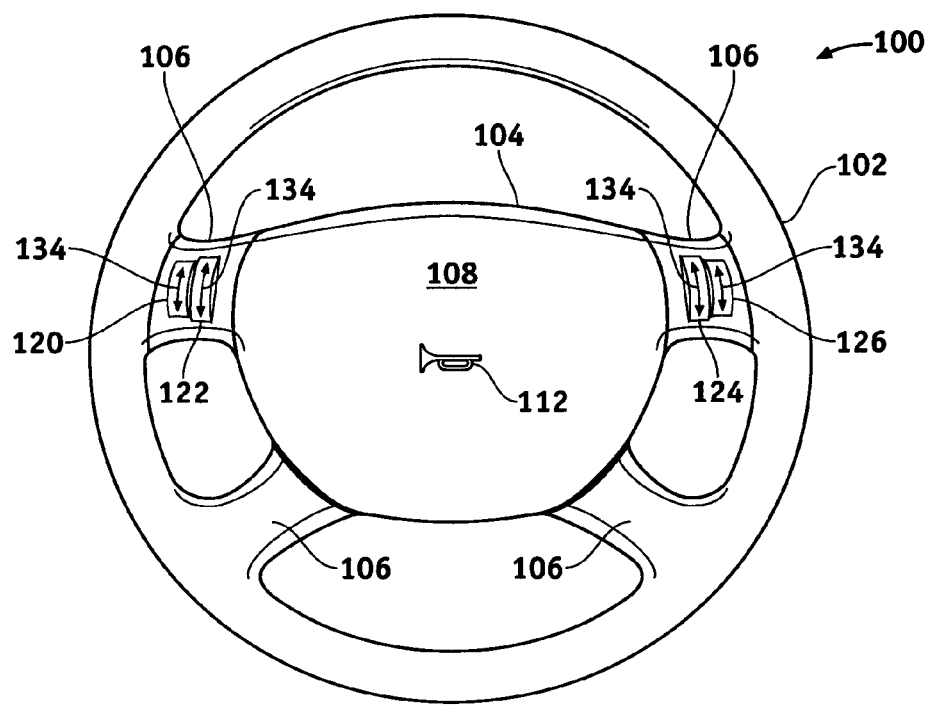
FIGS. 1 and 2 are front and rear views of a user control deployed on the steering wheel of a vehicle in accordance with a first embodiment of the present invention.
Figure 2:
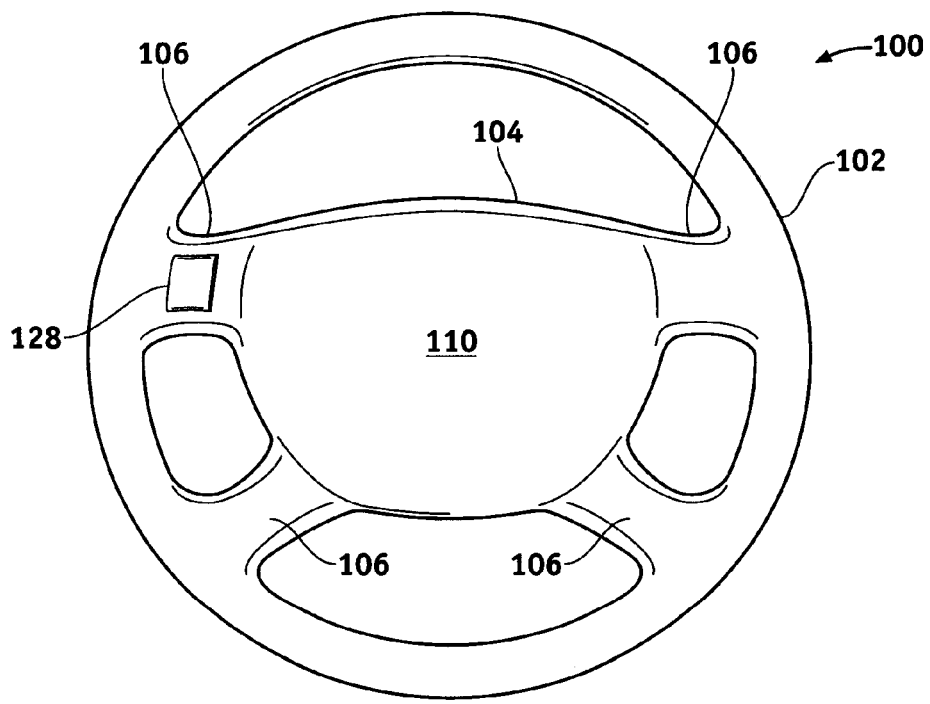

FIGS. 1 and 2 are front and rear views of a steering wheel control assembly deployed on a steering wheel 100 of a vehicle (not shown) in accordance with a first embodiment of the present invention. Steering wheel 100 comprises a rim portion 102 coupled to a central portion 104 by way of a plurality of spoke portions 106. Rim portion 102, central portion 104, and spoke portions 106 cooperate to form a front surface 108 (FIG. 1) and a rear surface 110 (FIG. 2). A horn symbol 112 on front surface 108 indicates the location of a horn activation switch.

The inventive steering wheel control assembly comprises at least two rotary dials and at least one button. In the exemplary embodiment illustrated in FIGS. 1 and 2, the steering wheel control assembly comprises four rotary dials 120, 122, 124, and 126 and one button 128. Rotary dials 120, 122, 124, and 126 may be mounted on front surface 108 proximate spoke portions 106 and are thus readily accessible to a driver as he or she grips steering wheel 100. Specifically, rotary dials 120 and 122 may be disposed in a left-hand grouping proximate a first of spoke portions 106 and are thus actuatable by the thumb of a driver's left hand, and rotary dials 124 and 126 may be disposed in a right-hand grouping proximate a second of spoke portions 106 and are thus actuatable by the thumb of a driver's right hand. Button 128 is mounted within rear surface 104 proximate spoke portions 106 so as to be depressible by the driver's non-thumb fingers as he or she grips steering wheel 100. Preferably, button 128 is mounted substantially opposite either rotary dials 120 and 122 or dials 124 and 126 (the later configuration is shown in FIG. 2). By mounting button 128 in this manner, a driver may simultaneously actuate selected ones of rotary dials 120, 122, 124, and 126 and button 128.

If desired, rotary dials 120, 122, 124, and 126 may be provided with an ergonomic shape (e.g., a radial depression). To increase the ease with which a driver may locate a desired dial, the rotary dials may also be made tactilely distinguishable from one another. For example, the outer surfaces of rotary dials 120, 122, 124, and 126 may be provided with varying tactile patterns (e.g., various combinations of ridges, bumps, concavities, etc.). Additionally, the rotary dials may be chosen to be different sizes. As shown in FIGS. 1 and 2, for example, rotary dials 122 and 124 may be chosen to have a larger diameter than dials 120 and 126.

Figure 3:
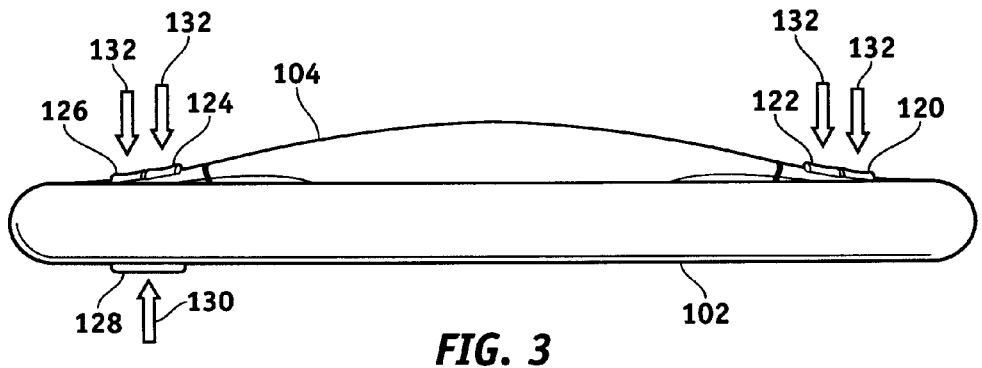
FIG. 3 is a functional side view of the user control shown in FIGS. 1 and 2 illustrating the ways in which the button and rotary dials of the user control may be actuated.

FIG. 3 is a functional side view of the steering wheel control assembly shown in FIGS. 1 and 2. FIGS. 2 and 3 collectively illustrate the various ways in which button 128 and rotary dials 120, 122, 124, and 126 may be actuated. As is indicated in FIGS. 2 and 3, button 128 is configured to be depressible (indicated by arrow 130 in FIG. 3), and rotary dials 120, 122, 124, and 126 are configured to be rotatable (indicated by arrows 134 in FIG. 2), perhaps around one or more common rotational axes. In addition, some or all of the rotary dials of the steering wheel control assembly may be configured to be depressible (indicated by arrows 132 in FIG. 3). As will be seen, steering wheel control assembly is configured to receive system selection data and feature adjustment data from a user and thus permit a user to adjust the features of a selected system to preference. In a preferred embodiment described below, button 128 is utilized to select the vehicular system the user wishes to adjust, and rotary dials 108, 110, 112, and 114 are utilized to adjust one or more features associated with the selected system.

Figure 4:
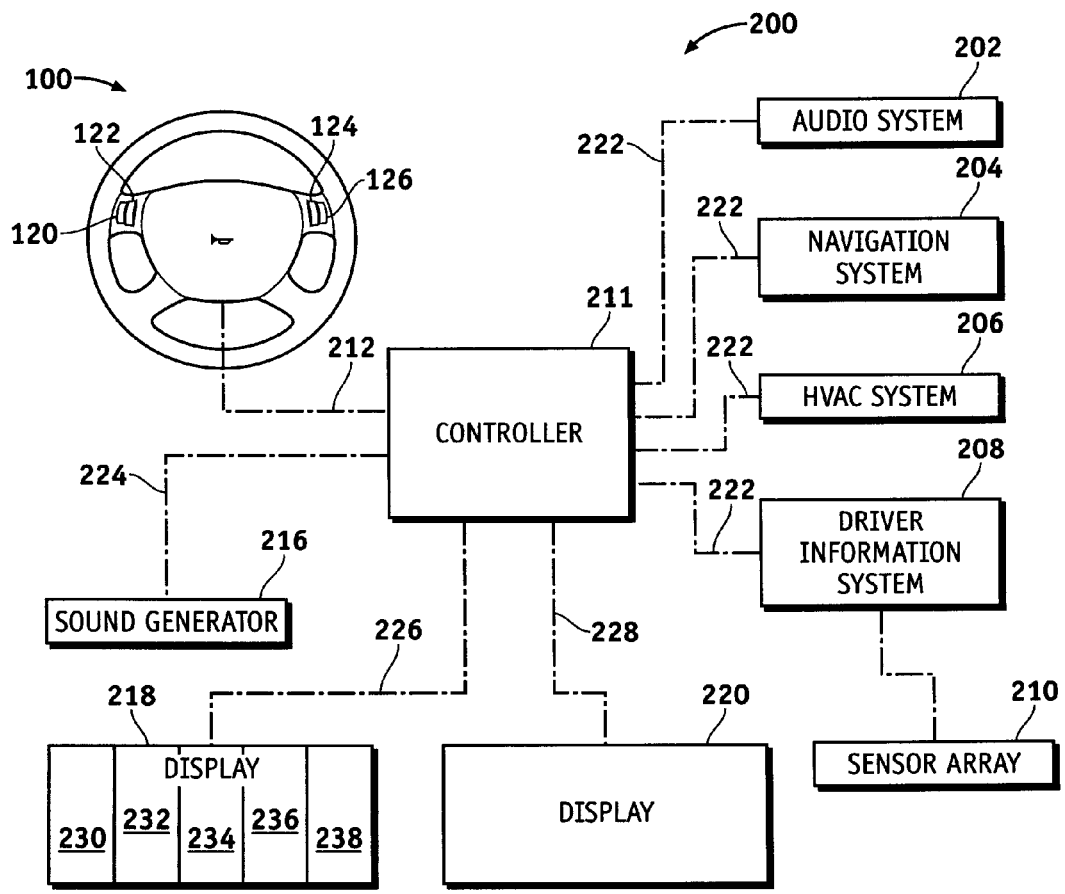
FIG. 4 is a block diagram of a user interface including the user control shown in FIGS. 1-3, a first display, a second display, a sound generator, and a plurality of vehicular systems.

FIG. 4 is a schematic of a user interface 200 including the steering wheel control assembly shown in FIGS. 1-3. User interface 200 allows a user to select options and adjust features associated with various vehicular systems. In addition, user interface 200 may permit a user to access vehicle status data (e.g., oil life, gas mileage, etc.) and customize certain vehicular characteristics (e.g., seat positioning, automatic door lock timing, etc.). In the illustrated embodiment, user interface 200 is capable of controlling four vehicular systems; i.e., an audio system 202; a navigational system 204; a heating, ventilation, and air conditioning (HVAC) system 206; and a driver information system 208, which is coupled to a sensor array 210 comprising a plurality of sensors each monitoring a different vehicular operating conditions (e.g., tire pressure, engine temperature, etc.).

User interface 200 comprises a controller 211 that is coupled to the user inputs provided on steering wheel 100 (i.e., button 128 and rotary dials 120, 122, 124, and 126) via data line 212. Additionally, controller 211 is coupled to each of the vehicular systems controllable by interface 200 and to a first display 218 via data lines 222 and 226, respectively. Preferably, display 218 comprises a head-up display mounted proximate steering wheel 100 (e.g., within the instrument control panel or within the vehicle's windshield). If desired, user interface 200 may also include a second display 220 and/or a sound generator 216 coupled to controller 211 via data lines 224 and 228, respectively. A second display 220 may be mounted at a location readily viewable by a passenger of the vehicle (e.g., proximate the vehicle's center stack) and is preferably configured to provide a passenger with substantially the same information as display 218 provides a driver. It should be understood, however, that display 220 is not essential to interface 200 and, consequently, only display 218 will be described in detail below.

Display 218 is configured to display the vehicular systems controllable by interface 200 and the adjustable features associated with each. Preferably, display 218 is visually organized into a plurality of display columns. As illustrated in FIG. 4, for example, display 218 may be divided into five display columns 230, 232, 234, 236, and 238. One column (e.g., column 230) may be configured to display the selected vehicular system. At the same time, the remaining columns (e.g., columns 232, 234, 236, and 238) may each display a different adjustable feature associated with the selected system (i.e., an adjustable aspect of the system, such as temperature for HVAC system 206) or options associated with particular system features as described below.

Figure 5:
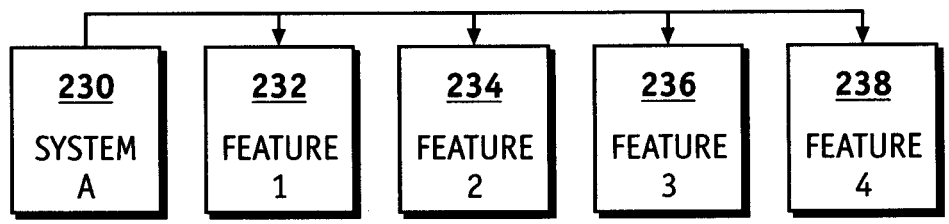
FIGS. 5 and 6 are block diagrams illustrating the relationship between first and second vehicular systems, respectively, and the features associated therewith as displayed by the user interface shown in FIG. 4.

FIG. 5 is block diagram illustrating the relationship between a selected vehicular system (SYSTEM A) and four adjustable features associated therewith as displayed on display 218 of user interface 200 (FIG. 4). As shown in FIG. 5, display column 230 indicates that SYSTEM A has been selected, and display columns 232, 234, 236, and 238 each display a different feature associated with SYSTEM A (i.e., system features 1, 2, 3, and 4, respectively). For example, if SYSTEM A were HVAC system 206 (FIG. 4), column 232 might display a heating/ventilation/cooling feature, column 234 might display a driver temperature feature, column 236 might display a passenger temperature feature, and column 238 might display a vent selection feature.

Figure 6:
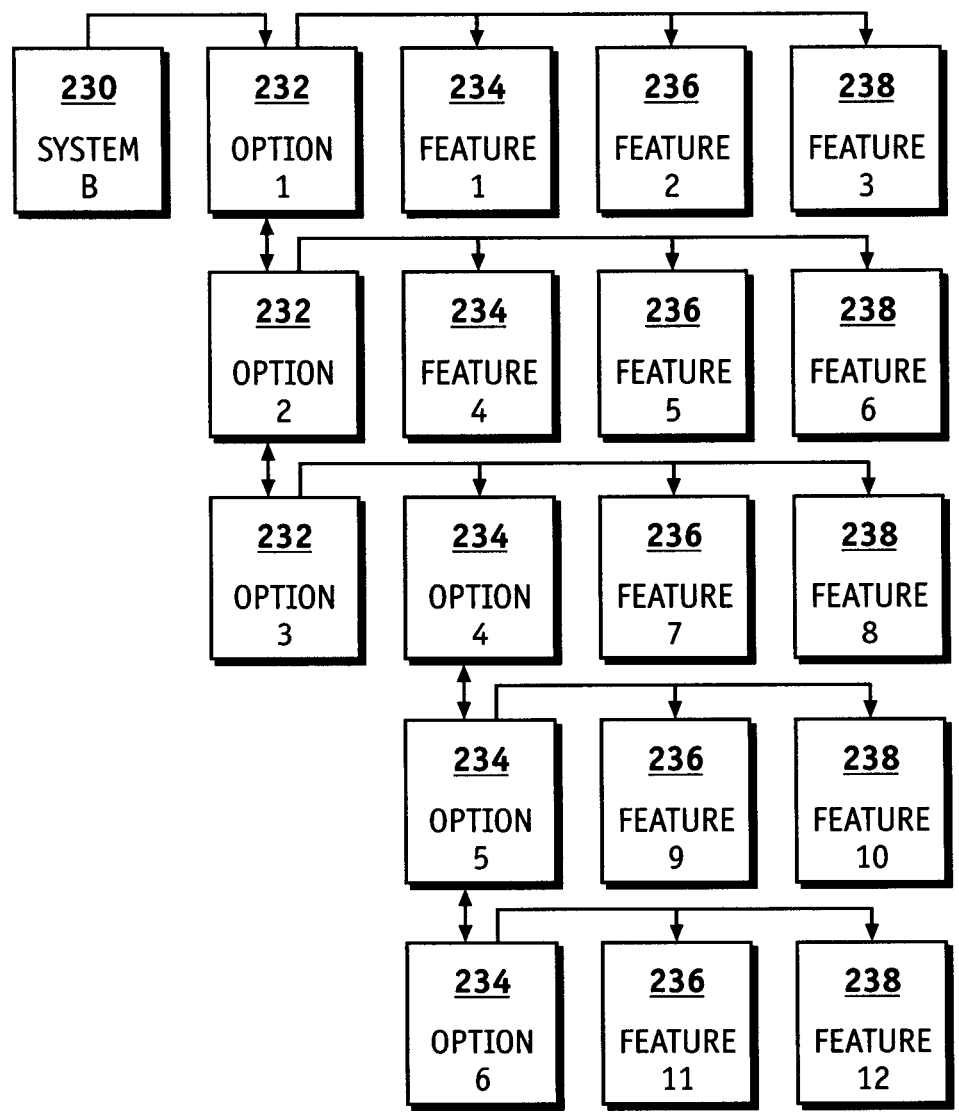

FIG. 6 is block diagram illustrating the relationship between a selected vehicular system (SYSTEM B) having multiple adjustable features associated with multiple options as expressed by display 218 of user interface 200 (FIG. 4). As was the case previously, display column 236 indicates the selected system (SYSTEM B). Display column 232 provides a user with a visual representation (e.g., a textual list, a group icons, etc.) of three options (OPTIONS 1-3) associated with SYSTEM B that he or she may select amongst in the manner described below. If a user selects OPTION 1 or OPTION 2, display columns 234, 236, and 238 will each display a different feature associated with the selected option (i.e., FEATURES 1-3 or FEATURES 4-6, respectively). In contrast, if a user selects OPTION 3, display column 234 provides the user with three more options (OPTIONS 4-6) from which the user may select amongst. Again, the features displayed in columns 236 and 238 change in relation to the option the user selects from column 234. Thus, if OPTION 4 is selected, display columns 236 and 238 will display and the user will be permitted to choose amongst adjustable FEATURES 7 and 8, respectively; if OPTION 5 is selected, display columns 236 and 238 will display and the user will be permitted to choose amongst adjustable FEATURES 9 and 10, respectively; and if OPTION 6 is selected, display columns 236 and 238 will display and the user will be permitted to choose amongst adjustable FEATURES 11 and 12, respectively. As will be further illustrated below, multi-dependent arrangements of this type are useful to organize vehicular systems having a large number of adjustable system features (e.g., audio systems, navigational system, etc.).

Figure 7:
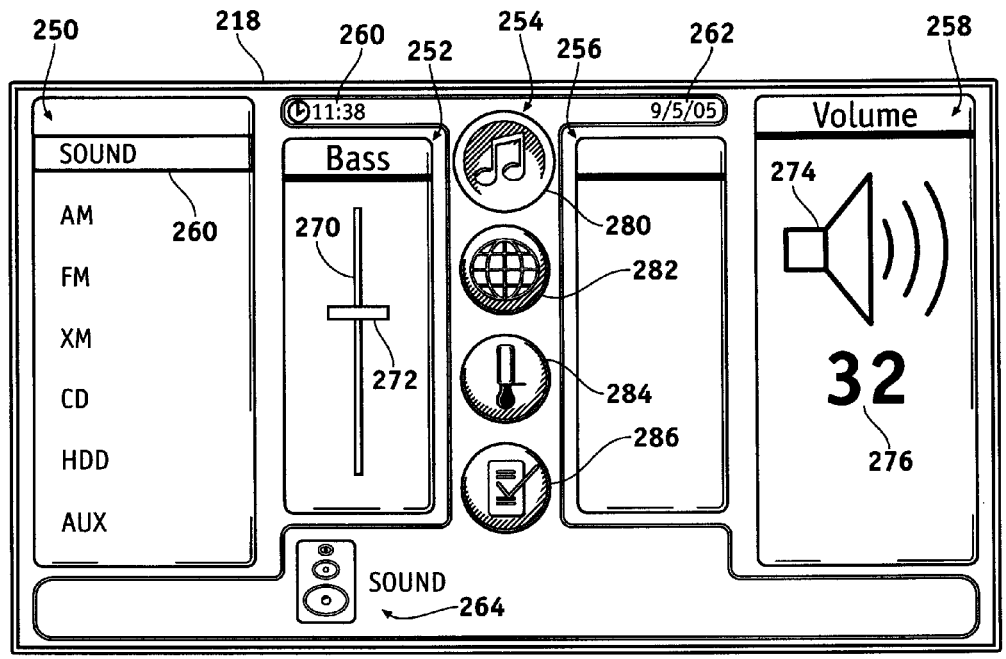
FIGS. 7-10 illustrate one way in which the first display of the user interface shown in FIG. 4 may be configured to appear as a user adjusts features associated with a vehicle's audio system.

FIGS. 7-10 illustrate one way in which display 218 of the user interface 200 may be configured to appear as a user adjusts features associated with audio system 202 (FIG. 4). Referring first to FIG. 7, it may be seen that display 218 includes five discrete display columns: an outer left column 250, an inner left column 252, a central column 254, an inner right column 256, and an outer right column 258. Display 218 may also include other display elements, such as a time indicator 260, a date indicator 262, and a status indicator 264. Central display column 254 indicates the vehicular systems that may be adjusted via user interface 200 and the vehicular system that is currently selected. To accomplish this, column 254 may comprise a vertical row of icons each representing a different vehicular system. As illustrated, icon 280 (a musical note) represents audio system 202, icon 282 (a stylized globe) represents navigation system 204, icon 284 (a thermometer) represents HVAC system 206, and icon 286 (a checked box) represents driver information system 208. Icons 280, 282, 284, and 286 may be configured to appear depressed (convex) when selected and raised (convex) when not selected. In FIG. 7, icon 280 appears depressed to indicate that audio system 202 is currently selected. This is also indicated by status indicator 264, which displays a suggestive graphic (i.e., a speaker) and descriptive text (i.e., "SOUND").

In accordance with the exemplary embodiment of the present invention, button 128 (FIGS. 2 and 3) is utilized to select amongst audio system 202, navigation system 204, HVAC system 206, and driver information system 208. A user of interface 200 selects a desired vehicular system by repeatedly pressing button 128 until display column 254 indicates that the desired system is selected. A user desiring to alter the temperature in the passenger compartment of the vehicle, for example, would press button 128 twice to move the selection from audio system 202 to HVAC system 206. When HVAC system 206 is selected, icon 284 will appear depressed and status indicator 264 will display a new graphic (e.g., an ice crystal) and textual message (e.g., "CLIMATE CONTROL") indicative of the newly selected system. Additionally, sound generator 216 (FIG. 4) may provide some form of audible feedback (e.g., a chime or message such as "climate control selected").

Figure 9:
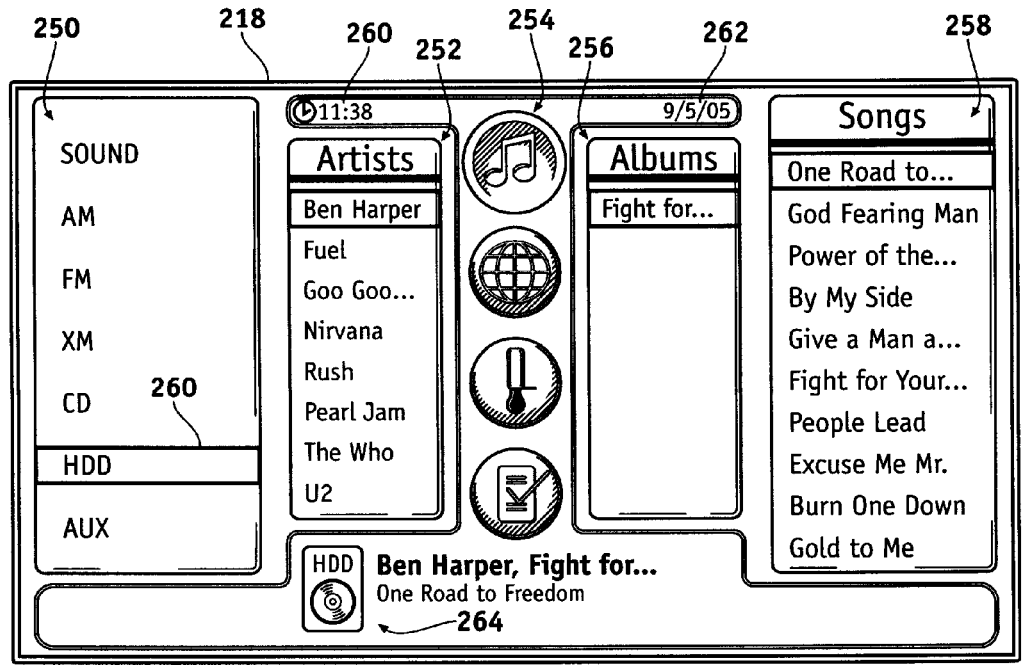

After a vehicular system is selected in the manner described above, columns 250, 252, 256, and 258 will each display an option or a feature associated with the selected system. As shown in FIG. 5, for example, when audio system 202 is selected, column 250 may display audio source options (e.g., AM, FM, XM, CD, hard-disc drive, and auxiliary) and a SOUND option. When the SOUND option is selected (as indicated in FIG. 7 by highlight bar 260), column 252 may display tone balance features (e.g., the base or treble level), and column 258 may display a volume feature. Thus, it should be appreciated that the features displayed in columns 252 and 258 are associated with the selected SOUND option as indicated in column 250. If a user were to change the selected SOUND option by rotating dial 120 (FIGS. 1-4), the features shown in columns 252 and 258 will change correspondingly. When the HDD option is selected as shown in FIG. 9, for example, columns 252 and 258 will each display a new feature associated with the HDD option. This notwithstanding, it should also be remembered that certain features may be dependent only upon the selected system. For example, referring again to FIG. 7, the selection of a particular bass level from column 252 will have no bearing on the audio source feature shown in column 250 or the volume level feature shown in column 258.

Figure 8:
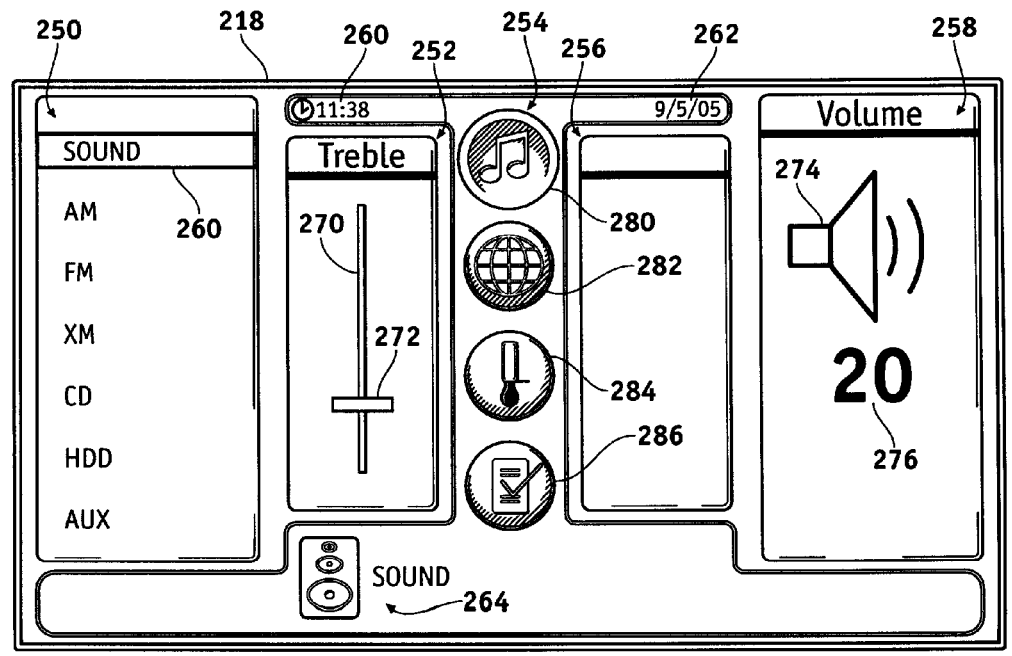

A user may select amongst the options and features shown in display columns 250, 252, 254, and 256 via rotary dials 120, 122, 124, and 126, respectively. In certain instances, the selection process may simply involve rotating the dial associated with a particular feature (or option) until the associated display column indicates that the feature (or option) has been selected. For example, a user wishing to adjust the volume feature of audio system 202 may do so by rotating dial 126 until the desired volume setting is achieved. To decrease the volume level of audio system 202 (as shown in FIG. 7), a user may rotate dial 126 in a first direction until the volume reaches the desired level (as shown in FIG. 8), which may be indicated by graphic 274 and decibel display element 276. Conversely, to increase the volume level, a user may simply rotate dial 126 in a second direction (opposite the first direction) until the desired increase in volume is achieved.

Certain features may be divided into multiple feature aspects, and Only one feature aspect may be displayed in a particular column at a particular time. Comparing FIG. 7 to FIG. 8, for example, it may be seen that the tone balance option displayed in column 252 contains at least two adjustable feature aspects: a first feature aspect shown in FIG. 7 (i.e., the bass level) and a second feature aspect shown in FIG. 8 (i.e., the treble level). A user may navigate between these aspects by, for example, depressing the dial associated with the feature. Thus, to move from the bass level aspect shown in FIG. 7 to the treble level aspect shown in FIG. 8, a user may press rotary dial 122. A user may then adjust the treble level by rotating dial 122 to graphically move slide 272 upward or downward on slide control 270, or return to the bass level aspect (FIG. 7) by again pressing rotary dial 122.

Certain selection processes may require a user perform two steps to complete selection. First, the user may be required to specify a feature or option by rotating a rotary dial as described above. Secondly, the user may be required to select or activate that option or feature by depressing the rotary dial. For example, to choose the HDD option from the group displayed in display column 250, a user may be required to rotate dial 120 until the HDD option is highlighted by highlight bar 260 as shown in FIG. 7 and, subsequently, depress dial 120 to select the HDD option. This type of selection process is preferable when it is not desirable to activate multiple options or features when navigating to a desired feature.

Figure 10:
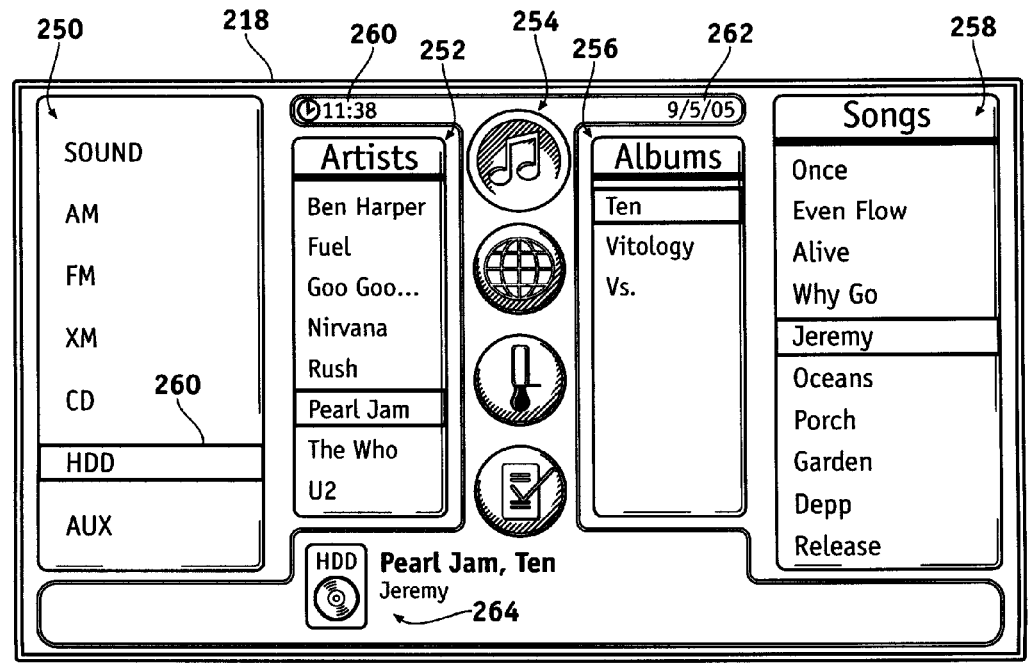

After the HDD option has been selected in the manner described above, display columns 252, 256, and 258 will each display a different feature or option associated with the HDD option. As shown in FIG. 9, columns 252, 256, and 258 may display textual lists of artists, albums, and songs, respectively. In addition, status indicator 264 will change to reflect the change in audio system option (i.e., the speaker graphic may change to a disc graphic and the text may change to describe the current artist, album, and song). It should thus be appreciated that the feature displayed in column 258 is dependent on the selected option from column 256, which is, in turn, dependent on the selected option from column 252. That is, the song feature (column 258) is dependent upon the album selected from the album option (column 256), which is dependent upon the artist selected from the artist option (column 252). If a user were to rotate dial 122 to select "Pearl Jam" from the artists option (column 252) as shown in FIG. 10, the album option (column 256) would change to a group containing Pearl Jam albums stored on the hard-disc drive of audio system 202. If, after selecting Pearl Jam from the artists option (column 252), a user were to rotate dial 124 to select a different album from the Pearl Jam album option (column 256), the song feature (column 258) would change to indicate the songs from the newly selected album that are stored on the hard-disc drive of audio system 202.

It should thus be appreciated from the above that a user interface employing a relatively intuitive and shallow menu structure (i.e., comprising no or few tiers) has been provided. It should also be appreciated that a user control for utilizing such a user interface has also been provided, which is easily accessible to a driver and a front-seat passenger of a vehicle. Additionally, it should be understood that the user interface may also be used to access and view vehicle status data (e.g., gas mileage, tire pressure, oil life, etc.). While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A user control system for a vehicle, the user control system comprising:
   a controller;
   a plurality of vehicular systems controllable by the controller;
   a steering wheel having a front surface and a rear surface, the steering wheel including a left spoke portion and a right spoke portion;
   a button mounted on the rear surface of the steering wheel and coupled to the controller, the button being depressible to select a selected vehicular system amongst the plurality of vehicular systems by pressing the button;
   a head-up display coupled to the controller, wherein the head-up display includes:
      an outer left column corresponding to a first adjustable aspect of the selected vehicular system;
      an inner left column corresponding to a second adjustable aspect of the selected vehicular system;
      an inner right column corresponding to a third adjustable aspect of the selected vehicular system;
      an outer right column corresponding to a fourth adjustable aspect of the selected vehicular system; and
      a central column indicating the plurality of vehicular systems and indicating the selected vehicular system of the plurality of vehicular systems;
   a first rotary dial mounted on the front surface of the left spoke portion, the first rotary dial being coupled to the controller and rotatable to adjust the first adjustable aspect of the selected vehicular system;
   a second rotary dial mounted on the front surface of the left spoke portion, the first rotary dial being disposed radially outward from a center portion of the steering wheel relative to the second rotary dial, the second rotary dial being coupled to the controller and rotatable to adjust the second adjustable aspect of the selected vehicular system;
   a third rotary dial mounted on the front surface of the right spoke portion, the third rotary dial being coupled to the controller and rotatable to adjust the third adjustable aspect of the selected vehicular system; and
   a fourth rotary dial mounted on the front surface of the right spoke portion, the fourth rotary dial being disposed radially outward from the center portion of the steering wheel relative to the third rotary dial, the fourth rotary dial being coupled to the controller and rotatable to adjust the fourth adjustable aspect of the selected vehicular system.

2. The user control system of claim 1, wherein the first rotary dial is configured to:
   specify the first adjustable aspect from a plurality of adjustable aspects in response to the first rotary dial being rotated; and
   activate the first adjustable aspect in response to the first rotary dial being depressed.

3. The user control system of claim 2, wherein:
   the second adjustable aspect is associated with the first adjustable aspect;
   the third adjustable aspect is dependent on the second adjustable aspect; and
   the fourth adjustable aspect is dependent on the third adjustable aspect.

4. The user control system of claim 3, wherein in response to the second rotary dial being rotated to select a first option associated with the first adjustable aspect, the inner right column displays one or more options associated with the third adjustable aspect corresponding to the first option.

5. The user control system of claim 4, wherein in response to the third rotary dial being rotated to select a second option associated with the third adjustable aspect from the one or more options corresponding to the first option, the outer right column displays one or more options associated with the fourth adjustable aspect corresponding to the second option.

6. The user control system of claim 1, wherein:
   the column comprises a plurality of icons, each respective icon representing a respective vehicular system of the plurality of vehicular systems; and
   the icon corresponding to the selected vehicular system appears depressed relative to remaining icons of the plurality of icons.

7. The user control system of claim 6, wherein the icon corresponding to the selected vehicular system changes from appearing raised to appearing depressed in response to the button being depressed, thereby indicating the selected vehicular system is selected.

* * * * *